US012763026B2

(12) United States Patent
Lee et al.

(10) Patent No.: US 12,763,026 B2
(45) Date of Patent: Oct. 13, 2026

(54) PIXEL CIRCUIT, DISPLAY DEVICE INCLUDING THE SAME, AND METHOD OF DRIVING THE SAME

(71) Applicant: LG Display Co., Ltd., Seoul (KR)

(72) Inventors: Kun Young Lee, Paju-si (KR); Dong Ho Lee, Paju-si (KR); Ka Young Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/388,347

(22) Filed: Nov. 13, 2025

(65) Prior Publication Data

US 2026/0148697 A1 May 28, 2026

(30) Foreign Application Priority Data

Nov. 26, 2024 (KR) ........................ 10-2024-0171165

(51) Int. Cl.
*G09G 3/3233* (2016.01)

(52) U.S. Cl.
CPC ... *G09G 3/3233* (2013.01); *G09G 2320/0209* (2013.01); *G09G 2320/0223* (2013.01)

(58) Field of Classification Search
None
See application file for complete search history.

(56) References Cited

U.S. PATENT DOCUMENTS 9,064,454 B2 6/2015 Han et al.
11,626,076 B2 4/2023 Yu
2006/0186824 A1 8/2006 Sun
2012/0293479 A1* 11/2012 Han ..................... H04N 13/341 345/212
2014/0139503 A1* 5/2014 Han ..................... G09G 3/3233 345/212
2017/0162118 A1* 6/2017 Liu ...................... G09G 3/3241
2017/0352311 A1 12/2017 Lee et al.
2018/0122301 A1* 5/2018 Yoon .................... G09G 3/3258
2019/0228707 A1 7/2019 Park et al.
2021/0407402 A1* 12/2021 Xu ....................... G09G 3/3233
2023/0252935 A1* 8/2023 Park ...................... G09G 3/006 345/55
2023/0401990 A1 12/2023 Wang et al.

(Continued)

FOREIGN PATENT DOCUMENTS

KR 10-0623919 9/2006
KR 10-2013-0075429 7/2013

(Continued)

*Primary Examiner* — Dorothy Harris
(74) *Attorney, Agent, or Firm* — PnK IP LLC

(57) ABSTRACT

A pixel circuit includes: a capacitor; a switching transistor configured to be turned on in response to a scan signal applied through a scan line to transmit a data voltage applied through a data line to the capacitor; a signal delay compensation circuit including a compensation transistor configured to be turned on in response to the scan signal and a compensation capacitor, the signal delay compensation circuit being configured to compensate for a signal delay of the scan signal in response to a change in the data voltage; a driving transistor configured to generate a driving current based on the data voltage stored in the capacitor; and a light-emitting diode configured to operate based on the driving current to emit light.

21 Claims, 16 Drawing Sheets

(56) References Cited

U.S. PATENT DOCUMENTS

| | | | | |
|---|---|---|---|---|
| 2024/0005867 | A1 * | 1/2024 | Lee | G09G 3/3258 |
| 2025/0046243 | A1 * | 2/2025 | Huang | G09G 3/3233 |

FOREIGN PATENT DOCUMENTS

| | | |
|---|---|---|
| KR | 10-1457035 | 11/2014 |
| KR | 10-1502070 | 3/2015 |
| KR | 10-2022-0093905 | 7/2022 |

* cited by examiner

FIG. 14

| CT | | | | | | |
|---|---|---|---|---|---|---|
| Scan1 | Vdata | G | S | D | Vgs | Vds |
| 10(on) | 6.5(W) | 10 | 6.5 | 7 | 3.5 | 0.5 |
| | 0.5(B) | 10 | 0.5 | 7 | 9.5 | 6.5 |
| −10(off) | 6.5(W) | −10 | 6.5 | 7 | −16.5 | 0.5 |
| | 0.5(B) | −10 | 0.5 | 7 | −10.5 | 6.5 |

PIXEL CIRCUIT, DISPLAY DEVICE INCLUDING THE SAME, AND METHOD OF DRIVING THE SAME

CROSS REFERENCE TO RELATED APPLICATION

This application claims priority from and the benefit of Korean Patent Application No. 10-2024-0171165, filed on Nov. 26, 2024, which is hereby incorporated by reference for all purposes as if fully set forth herein.

BACKGROUND

Field

Embodiments of the invention relate generally to a display device and a method of driving the same, and more specifically, to a pixel circuit of a display device and a driving method thereof for differentially compensating for a variation in effective capacitance of a switching transistor caused by a change in data voltage.

Discussion of the Background

With the advancement of information technology, the market for display devices, which serve to convey information to users, continues to expand. Accordingly, the use of display devices such as light emitting display (LED) devices, quantum dot display (QDD) devices, and liquid crystal display (LCD) devices is also increasing.

The display devices described above include a display panel including subpixels, a driver that outputs driving signals for driving the display panel, and a power supply that generates power to be supplied to the display panel and/or the driver.

The display devices described above can display images by causing selected subpixels to transmit light or directly emit light when driving signals, such as a scan signal and a data signal, are supplied to the subpixels formed on the display panel.

The above information disclosed in this Background section is only for understanding of the background of the inventive concepts, and, therefore, it may contain information that does not constitute prior art.

SUMMARY

Pixel circuits, display devices including the same, and methods of driving the same according to embodiments of the invention are capable of eliminating a delay of a scan signal without increasing the load of a gate node of a driving transistor by differentially compensating for the amount of change in capacitance due to a change in a data voltage (or grayscale variation in a pattern).

Furthermore, according to embodiments, compensating for a delay (including variation) of a scan signal during data voltage writing can alleviate horizontal crosstalk generated per horizontal line (or scan line) and thereby uniformly improve display quality.

Additional features of the inventive concepts will be set forth in the description which follows, and in part will be apparent from the description, or may be learned by practice of the inventive concepts.

According to one or more embodiments of the invention, a pixel circuit includes: a capacitor; a switching transistor configured to be turned on in response to a scan signal applied through a scan line to transmit a data voltage applied through a data line to the capacitor; a signal delay compensation circuit including a compensation transistor configured to be turned on in response to the scan signal and a compensation capacitor, the signal delay compensation circuit being configured to compensate for a signal delay of the scan signal in response to a change in the data voltage; a driving transistor configured to generate a driving current based on the data voltage stored in the capacitor; and a light-emitting diode configured to operate based on the driving current to emit light.

The signal delay compensation circuit may be configured to vary an effective capacitance of the switching transistor in response to a change in the data voltage.

The compensation transistor may include a gate electrode connected to the scan line and a first electrode connected to a DC voltage line.

The compensation transistor may be configured to vary an effective capacitance of the switching transistor based on changes in a DC voltage applied through the DC voltage line and the data voltage.

The DC voltage line may include a high-level voltage line; and the compensation capacitor nay include a first electrode connected to a second electrode of the compensation transistor and a second electrode connected to the data line A capacitance of the compensation capacitor may be smaller than a capacitance of the capacitor.

According to one or more embodiments of the invention, a display device includes: a display panel including subpixels for displaying an image; and a driver configured to drive the display panel. Each of the subpixels includes a signal delay compensation circuit configured to be turned on according to a scan signal to compensate for a signal delay of the scan signal in response to a change in a data voltage.

The signal delay compensation circuit may include: a compensation transistor having a gate electrode connected to a scan line and a first electrode connected to a DC voltage line; and a compensation capacitor having a first electrode connected to a second electrode of the compensation transistor and a second electrode connected to a data line.

A capacitance of the compensation capacitor may be smaller than a capacitance of a capacitor storing the data voltage in each of the subpixels.

According to one or more embodiments of the invention, a method of driving a display device, includes: applying a scan signal to a scan line connected to a gate electrode of a switching transistor and storing a data voltage applied through a data line in a capacitor; driving a signal delay compensation circuit based on the scan signal to compensate for a signal delay of the scan signal in response to a change in the data voltage; and driving a driving transistor to generate a driving current based on the data voltage and causing a light-emitting diode to emit light based on the driving current.

The method may further include varying an effective capacitance of the switching transistor through operation of the signal delay compensation circuit in response to a change in the data voltage.

The step of driving the signal delay compensation circuit may further include: turning on a compensation transistor included in the signal delay compensation circuit in synchronization with the scan signal to apply a high-level voltage to a first electrode of a compensation capacitor; increasing a voltage of the data line by a coupling operation of the compensation capacitor included in the signal delay compensation circuit; changing a drain-source voltage condition of the switching transistor; and varying an effective capacitance of the switching transistor in response to the changed drain-source voltage condition.

According to one or more embodiments of the invention, a pixel circuit includes: a switching transistor having a gate electrode connected to a scan line, a first electrode connected to a data line, and a second electrode connected to a first node; a capacitor having a first electrode connected to the first node and a second electrode connected to a second node; a driving transistor having a gate electrode connected to the first node, a first electrode connected to a first power supply line, and a second electrode connected to the second node; a light-emitting diode having a first electrode connected to the second node and a second electrode connected to a second power supply line; a compensation transistor having a gate electrode connected to the scan line and a first electrode connected to the first power supply line; and a compensation capacitor having a first electrode connected to a second electrode of the compensation transistor and a second electrode connected to the data line.

The first power supply line may include a high-level voltage line and the second power supply line may include a low-level voltage line.

The compensation capacitor may be configured to perform a coupling operation to increase a voltage of the data line when the compensation transistor is turned on in synchronization with a scan signal applied to the scan line.

The coupling operation of the compensation capacitor may change a drain-source voltage condition of the switching transistor.

The switching transistor may have an effective capacitance which varies according to the changed drain-source voltage condition.

When a low-gray data voltage is applied through the data line, the coupling operation of the compensation capacitor may cause the drain-source voltage of the switching transistor to have a value greater than zero, and the switching transistor thereby has the effective capacitance restrained from excessive increase.

When a high-gray data voltage is applied through the data line, the coupling operation of the compensation capacitor may decrease a drain-source voltage of the switching transistor, and the switching transistor thereby has the effective capacitance increased according to the decreased drain-source voltage.

The effective capacitance of the switching transistor may include parasitic capacitances including a gate-to-source capacitance, a gate-to-drain capacitance, and a gate-to-bulk capacitance.

The compensation transistor and the compensation capacitor may be configured to vary the effective capacitance of the switching transistor to compensate for transition delay of a scan signal applied to a scan line.

The capacitor may be configured to store a data voltage supplied from the data line; and a capacitance of the compensation capacitor may be smaller than a capacitance of the capacitor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIG. 14 is a table illustrating a first scan signal, a data voltage, and a voltage value of a first switching transistor provided to describe signal delay compensation in a case where a compensation transistor and a compensation capacitor are included.

DETAILED DESCRIPTION

Figure 1:
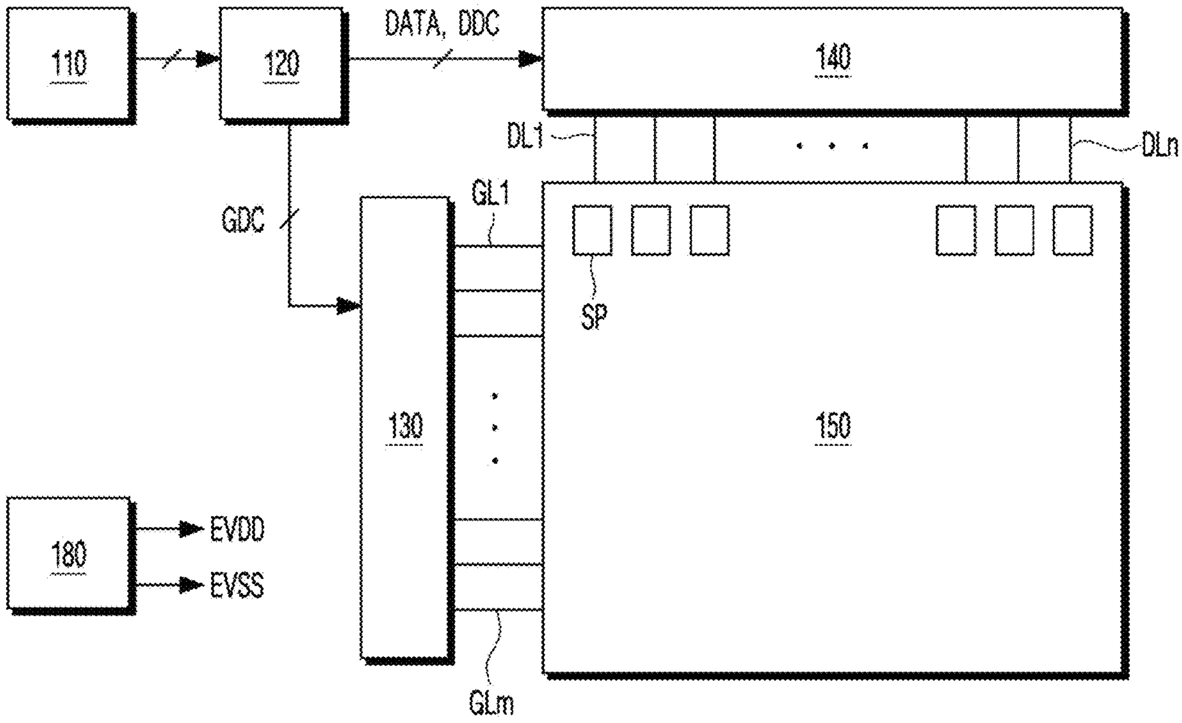
FIG. 1 is a schematic block diagram of a light-emitting display device according to an embodiment of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

A display device according to embodiments of the invention may be implemented as a television, a video player, a personal computer (PC), a home theater, an automobile electrical device, a smartphone, etc., but is not limited thereto. The display device according to embodiments of the invention may be implemented as a light emitting display (LED) device, a quantum dot display (QDD) device, a liquid crystal display (LCD) device, etc. Hereinafter, for convenience of description, a display device will exemplarily be described with reference to a light emitting display device that directly emits light based on inorganic light-emitting diodes or organic light-emitting diodes.

In addition, a transistor which will be described below may be implemented as an n-type transistor, a p-type transistor, or a combination of n-type and p-type transistors. The transistor has a three-electrode element including a gate, a source, and a drain. The source is an electrode that supplies carriers to the transistor. In the transistor, carriers start to flow from the source. The drain is an electrode through which carriers are discharged from the transistor. In particular, carriers flow from the source to the drain in the transistor.

In the case of a p-type transistor, carriers are holes, and thus the source voltage is higher than the drain voltage such that the holes can flow from the source to the drain. Since the holes flow from the source to the drain in the p-type transistor, the current flows from the source to the drain. On the other hand, in the case of an n-type transistor, carriers are electrons, and thus the source voltage is lower than the drain voltage such that the electrons can flow from the source to the drain. Since the electrons flow from the source to the drain in the n-type transistor, the current flows from the drain to the source. However, the source and drain of the transistor can be changed depending on the applied voltage. Accordingly, one of the source and drain will be described as a first electrode, and the other of the source and drain will be described as a second electrode in the following description.

Figure 2:
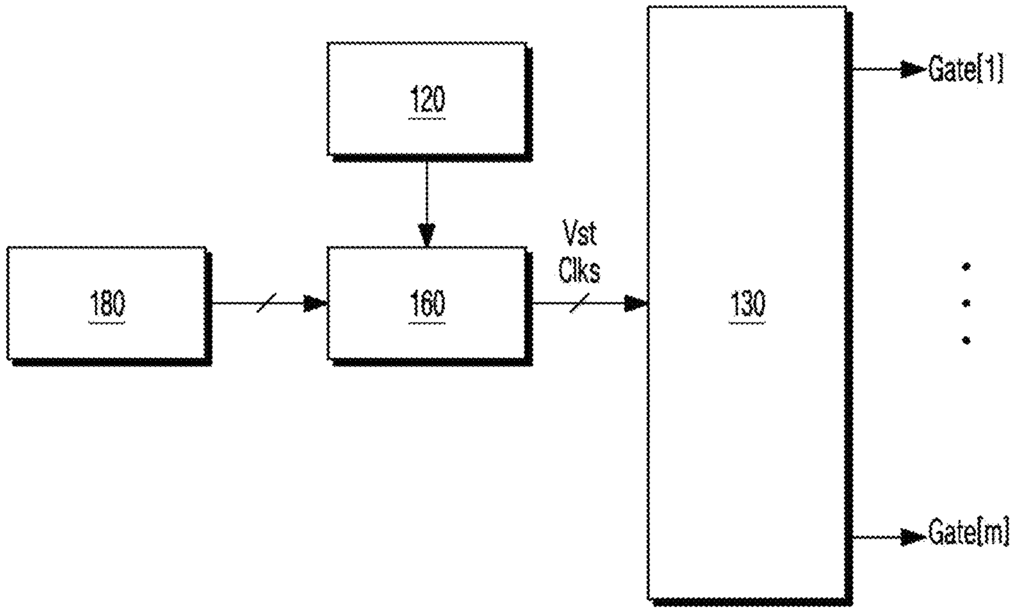
FIGS. 2 and 3 are diagrams schematically illustrating a configuration of a gate-in-panel type gate driver of the display device shown in FIG. 1.
Figure 3:
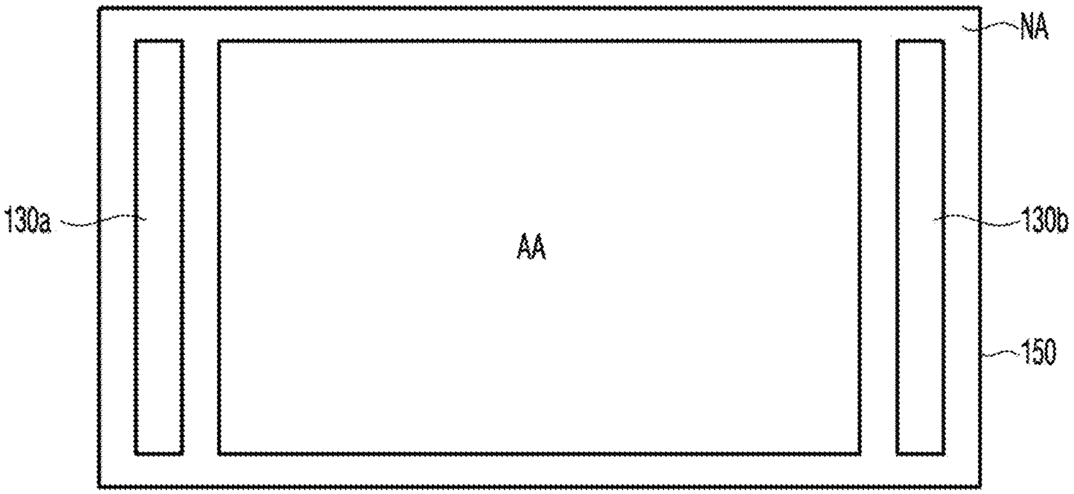

FIG. 1 is a schematic block diagram of a light-emitting display device according to an embodiment of the invention, and FIGS. 2 and 3 are diagrams illustrating a configuration of a gate-in-panel type gate driver of the display device shown in FIG. 1.

As shown in FIGS. 1, 2, and 3, the light-emitting display device may include a timing controller 120, a gate driver (gate driving circuit) 130, a data driver (data driving circuit) 140, a display panel 150, and a power supply 180.

An image provider (set or host system) 110 may output various driving signals in addition to external image data signals or image data signals stored in an internal memory. The image provider 110 may supply data signals and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals, such as a vertical synchronization signal Vsync and a horizontal synchronization signal Hsync. The timing controller 120 may supply a data signal DATA supplied from the image provider 110 along with the data timing control signal DDC to the data driver 140. The timing controller 120 may be formed as an integrated circuit (IC) and mounted on a printed circuit board, but is not limited thereto.

The gate driver 130 may output a gate signal (or gate voltage) in response to the gate timing control signal GDC supplied from the timing controller 120. The gate driver 130 may supply gate signals to subpixels included in the display panel 150 through gate lines GL1 to GLm. The gate driver 130 may be formed as an IC or may be formed directly on the display panel 150 in a gate-in panel structure, but is not limited thereto. Hereinafter, as an example, the gate driver 130 will be described with reference to the gate-in-panel type gate driver as shown in FIG. 2 and FIG. 3.

The gate-in-panel type gate driver 130 may include shift registers 130*a* and 130*b* formed in a gate-in-panel structure on one side and the other side of a non-active area NA of the display panel 150. The shift registers 130*a* and 130*b* may be formed in a thin film form on the non-active area NA of the display panel 150 in the gate-in-panel structure. The gate-in-panel type gate driver 130 may output gate signals Gate[1] to Gate[m] for turning on or off transistors formed in an active area AA of the display panel 150.

The gate-in-panel type gate driver 130 may operate based on signals and voltages output from the timing controller 120, the power supply 180, and a level shifter 160. The level shifter 160 may generate gate control signals required to drive the gate-in-panel type gate driver 130, 130*a*, and 130*b* based on signals and voltages output from the timing controller 120 and the power supply 180.

The data driver 140 may sample and latch a data signal DATA in response to a data timing control signal DDC supplied from the timing controller 120 and convert a digital data signal into an analog data voltage based on a gamma reference voltage and output the analog data voltage. The data driver 140 may supply a data voltage to subpixels included in the display panel 150 through data lines DL1 to DLn. The data driver 140 may be formed as an IC and mounted on the display panel 150 or on a printed circuit board, but is not limited thereto.

The power supply 180 may generate a high-level voltage and a low-level voltage based on an external input voltage supplied from the outside, and output the same through a high-level voltage line EVDD and a low-level voltage line EVSS. The power supply 180 may generate and output not only the high-level voltage and the low-level voltage, but also a voltage required to drive the gate driver 130 and a voltage required to drive the data driver 140.

The display panel 150 may be manufactured based on a rigid or flexible substrate such as glass, silicon, or polyimide. The display panel 150 may include a plurality of subpixels SP for displaying images. The subpixels SP can directly emit light toward an upper substrate, a lower substrate, or the upper substrate and the lower substrate of the display panel 150. Each subpixel SP can emit one color, such as red, green, blue, or white. The display panel 150 may display an image based on pixels composed of red subpixels, green subpixels, and blue subpixels, or pixels composed of red subpixels, green subpixels, blue subpixels, and white subpixels.

The timing controller 120, the gate driver 130, and the data driver 140 above have been exemplarily described as separate components. However, the inventive concepts are not limited thereto. In some embodiments, depending on the implementation method of the light-emitting display device, one or more of the timing controller 120, the gate driver 130, and the data driver 140 may be integrated into one IC.

Figure 4:
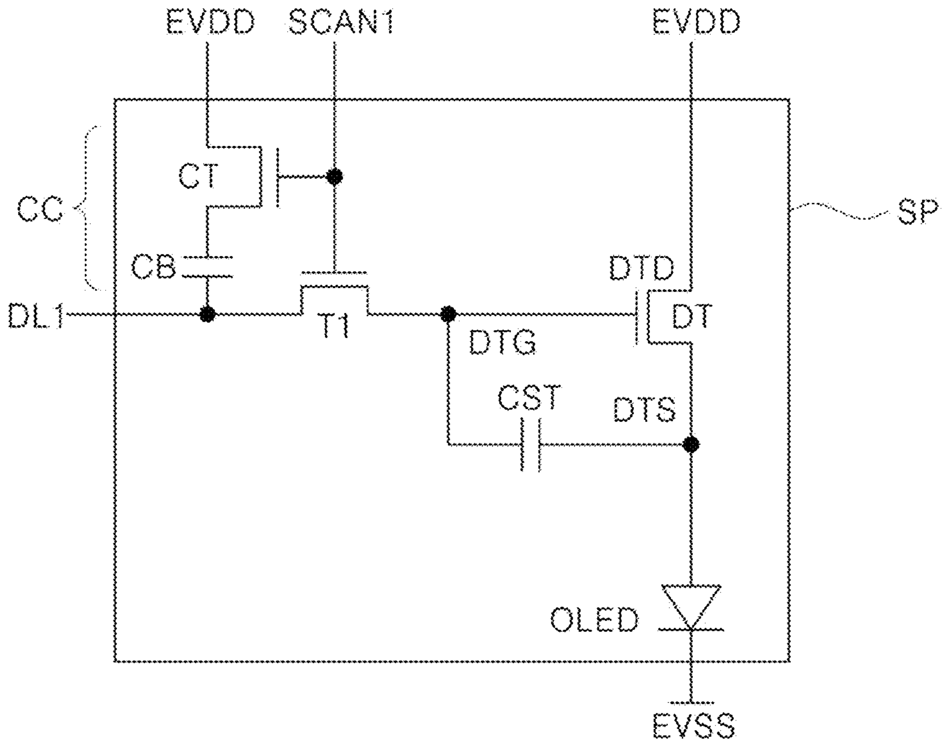
FIG. 4 is an equivalent circuit diagram of an illustrative pixel circuit of a subpixel according to a first embodiment of the invention.
Figure 5:
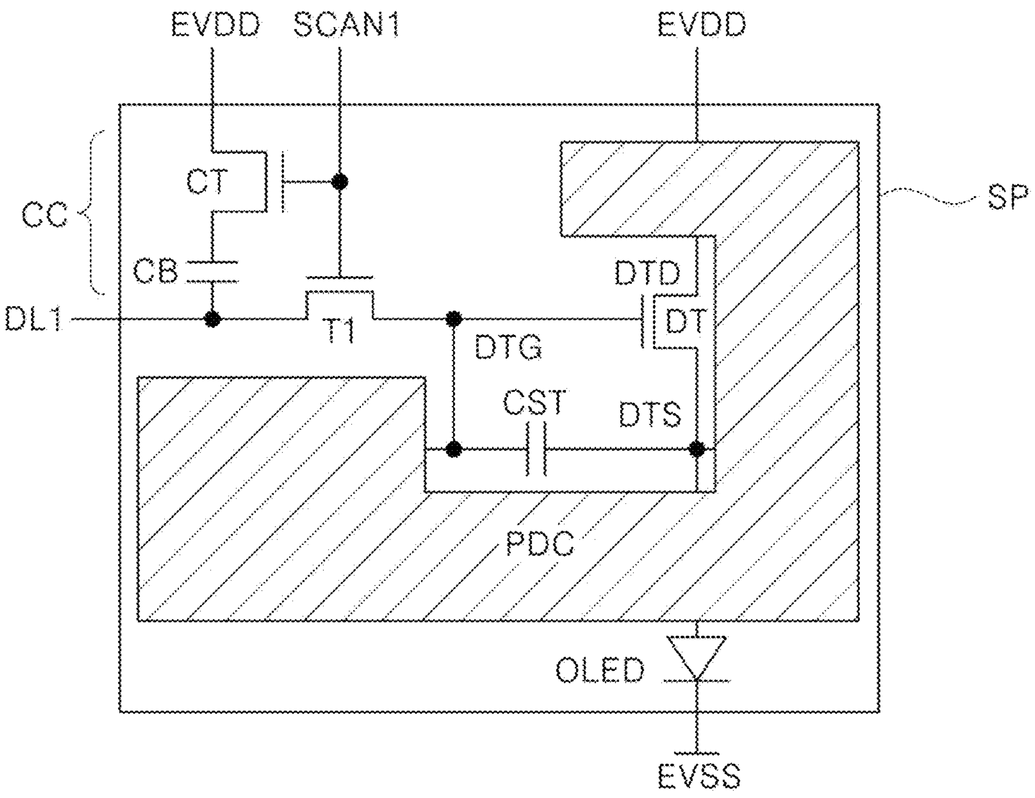
FIG. 5 is an equivalent circuit diagram of an illustrative pixel circuit of a subpixel according to a second embodiment of the invention.
Figure 6:
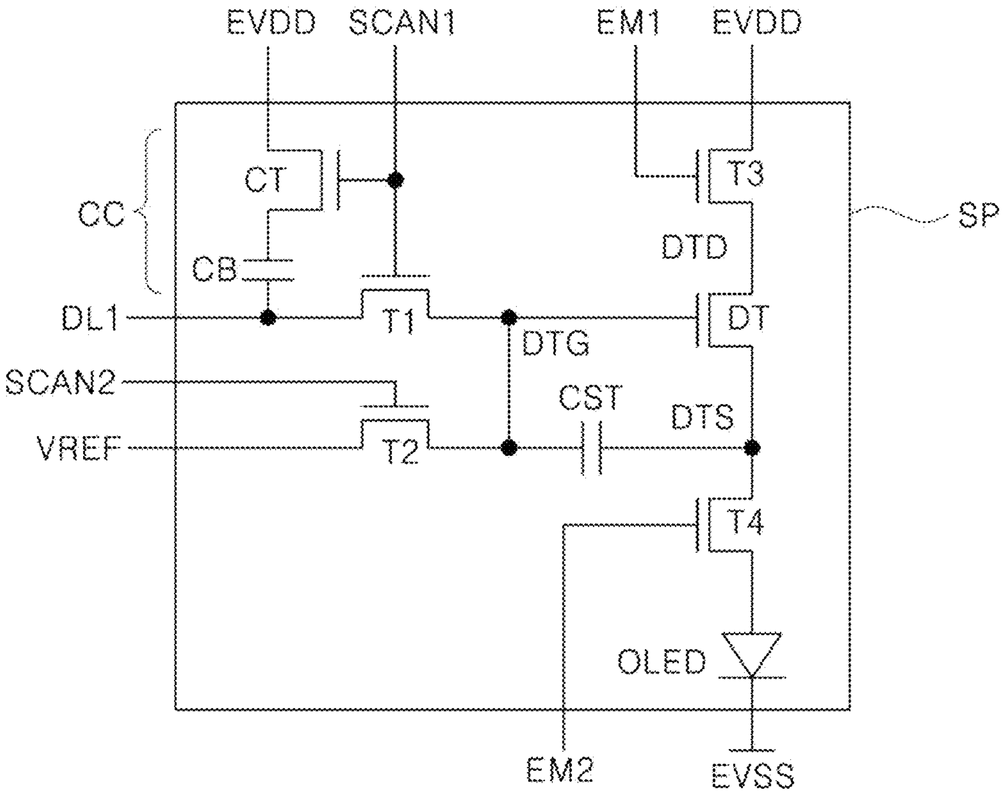
FIG. 6 is an equivalent circuit diagram of an illustrative pixel circuit of a subpixel according to a third embodiment of the invention.
Figure 7:
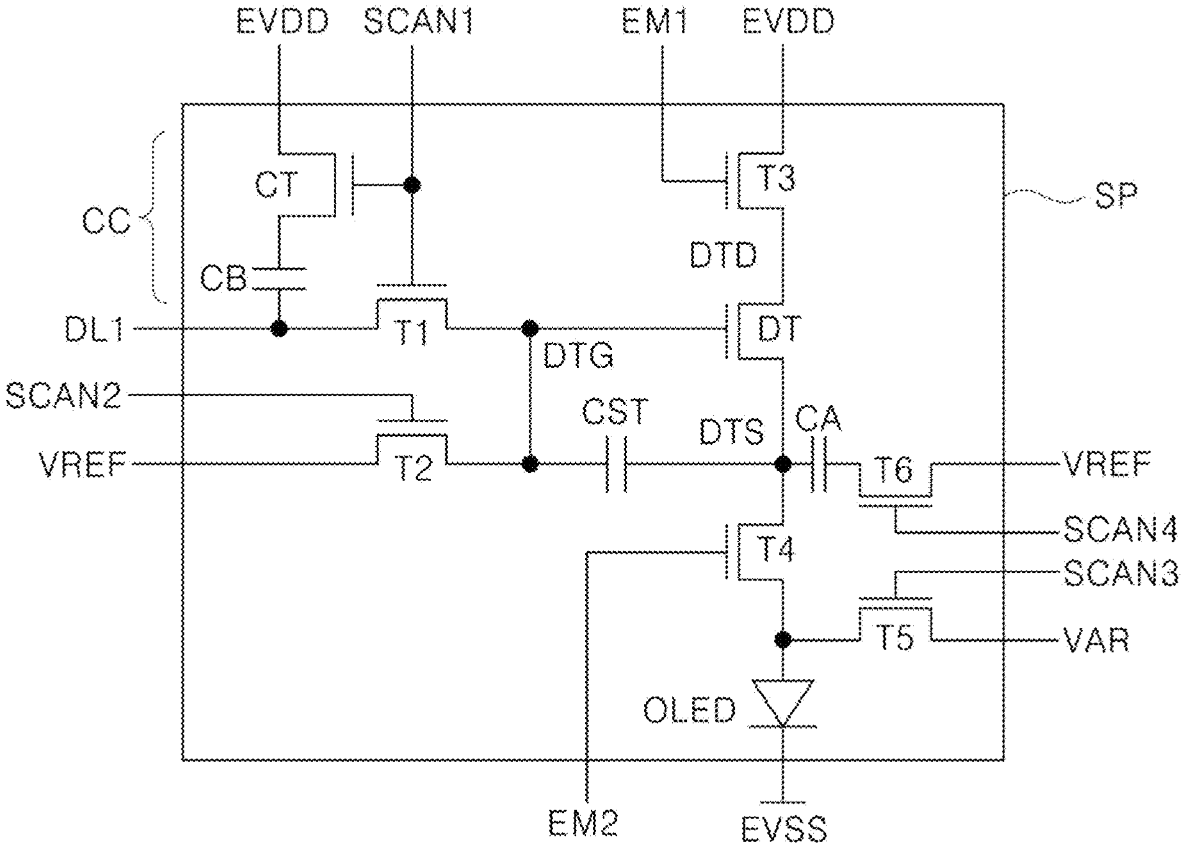
FIG. 7 is an equivalent circuit diagram of an illustrative pixel circuit of a subpixel according to a fourth embodiment of the invention.

FIG. 4 is an equivalent circuit diagram of an illustrative pixel circuit of a subpixel according to a first embodiment of the invention, FIG. 5 is an equivalent circuit diagram of an illustrative pixel circuit of a subpixel according to a second embodiment of the invention, FIG. 6 is an equivalent circuit diagram of an illustrative pixel circuit of a subpixel according to a third embodiment of the invention, and FIG. 7 is an equivalent circuit diagram of an illustrative pixel circuit of a subpixel according to a fourth embodiment of the invention.

As shown in FIG. 4, the subpixel SP according to the first embodiment may include a switching transistor T1, a compensation transistor CT, a driving transistor DT, a capacitor (or storage capacitor) CST, a compensation capacitor CB, and a light-emitting diode OLED. The compensation transistor CT and the compensation capacitor CB may be included in a signal delay compensation circuit CC.

The switching transistor T1 may have a gate electrode connected to a first scan line SCAN1, a first electrode connected to a first data line DL1, and a second electrode connected to a gate node DTG. The switching transistor T1 may be turned on based on a first scan signal applied through the first scan line SCAN1 and may transmit a data voltage applied through the first data line DL1 to a first electrode of the capacitor CST connected to the gate node DTG. The switching transistor T1 may have an effective capacitance due to parasitic capacitors formed between the gate electrode and the first electrode (e.g., source/drain electrode). As used herein, the term “effective capacitance” of the switching transistor T1 refers to an equivalent capacitance that includes parasitic capacitances such as a gate-to-source capacitance (Cgs), a gate-to-drain capacitance (Cgd), and a gate-to-bulk capacitance (Cgb), all of which contribute to charge accumulation and discharge during the on/off operation of the switching transistor. As such, the capacitance of the switching transistor T1 described below may be referred to as representing such effective capacitance. Further, the first scan signal and the data voltage may be described with reference to the waveform illustrated in FIG. 8.

The capacitor CST may have the first electrode connected to the gate node DTG to which the second electrode of the switching transistor T1 and a gate electrode of the driving transistor DT are connected, and a second electrode connected to a source node DTS to which a second electrode of the driving transistor DT and an anode of the light-emitting diode OLED are connected. The capacitor CST may apply a stored data voltage to the gate electrode of the driving transistor DT.

The compensation transistor CT may have a gate electrode connected to the first scan line SCAN1, a first electrode connected to a high-level voltage line EVDD, and a second electrode connected to a first electrode of the compensation capacitor CB. The compensation transistor CT can be turned on based on the first scan signal applied through the first scan line SCAN1 to transfer a high-level voltage applied through the high-level voltage line EVDD to the first electrode of the compensation capacitor CB. The compensation transistor CT may be disposed adjacent to the switching transistor T1. The compensation transistor CT may compensate for signal delay of the first scan signal applied to the gate electrode of the switching transistor T1 based on changes in the high-level voltage and the data voltage, and description related thereto will be given below.

The compensation capacitor CB may have the first electrode connected to the second electrode of the compensation transistor CT and a second electrode connected to the first data line DL1 and the first electrode of the switching transistor T1. The compensation capacitor CB may prevent a current path from being formed between the second electrode of the compensation transistor CT and the first data line DL1 (or to prevent direct coupling between the high-level voltage and the data voltage applied through the compensation transistor CT). As such, the compensation capacitor CB corresponds to a circuit added to prevent formation of a current path rather than to store a voltage, and may be implemented to have a capacitance smaller than the capacitance of the capacitor CST.

The driving transistor DT may have the gate electrode connected to the gate node DTG to which the second electrode of a switching transistor T1 and the first electrode of the capacitor CST are connected, a first electrode connected to a drain node DTD connected to the high-level voltage line EVDD, and the second electrode connected to the source node DTS to which the second electrode of the capacitor CST and the anode of the light-emitting diode OLED are connected. The driving transistor DT may operate based on a data voltage stored in the capacitor CST to generate a driving current.

The light-emitting diode OLED may have the anode connected to the source node DTS to which the second electrode of the capacitor CST and the second electrode of the driving transistor DT are connected, and a cathode connected to a low-level voltage line EVSS. The light-emitting diode OLED can emit light based on the driving current generated from the driving transistor DT.

Referring to FIG. 5, the subpixel SP according to the second embodiment may include a switching transistor T1, a compensation transistor CT, a driving transistor DT, a capacitor CST, a compensation capacitor CB, a light-emitting diode OLED, and a pixel driving circuit PDC.

The subpixel SP according to the second embodiment is similar to the subpixel SP according to the first embodiment, and differs therefrom in that the subpixel SP according to the second embodiment further includes the pixel driving circuit PDC. Since the switching transistor T1, the compensation transistor CT, the driving transistor DT, the capacitor CST, the compensation capacitor CB, and the light-emitting diode OLED have been described above with reference to FIG. 4, detailed descriptions thereto will be omitted. The pixel driving circuit PDC may be related to the operation of at least one of the driving transistor DT, the capacitor CST, or the light-emitting diode OLED. The pixel driving circuit PDC may include a circuit that can apply a voltage applied from the outside of the subpixel SP to the inside of the subpixel SP, or control a current or a voltage generated inside the subpixel SP.

The pixel driving circuit PDC may be configured in various forms depending on the circuit included in the subpixel SP and the driving method thereof. In FIG. 5, the pixel driving circuit PDC is exemplarily illustrated as a block. Hereinafter, examples related to the pixel driving circuit PDC will be described based on the third embodiment of FIG. 6 and the fourth embodiment of FIG. 7.

Referring to FIG. 6, the subpixel SP according to the third embodiment may include a first switching transistor T1, a second switching transistor T2, a third switching transistor T3, a fourth switching transistor T4, a compensation transistor CT, a driving transistor DT, a capacitor CST, a compensation capacitor CB, and a light-emitting diode OLED. Since the switching transistor T1, the compensation transistor CT, the driving transistor DT, the capacitor CST, the compensation capacitor CB, and the light-emitting diode OLED have been described above with reference to FIG. 4, detailed descriptions thereto will be omitted.

The second switching transistor T2, the third switching transistor T3, and the fourth switching transistor T4 may be included in the pixel driving circuit PDC illustrated in FIG. 5. Hereinafter, the second switching transistor T2, the third switching transistor T3, and the fourth switching transistor T4 will be described.

The second switching transistor T2 may have a gate electrode connected to a second scan line SCAN2, a first electrode connected to a reference voltage line VREF, and a second electrode connected to a gate node DTG. The second switching transistor T2 can be turned on based on a second scan signal applied through the second scan line SCAN2 to transmit a reference voltage applied through the reference voltage line VREF to the gate node DTG. In this regard, the second scan signal and the reference voltage may be described with reference to the waveform illustrated in FIG. 8.

The third switching transistor T3 may have a gate electrode connected to a first emission control line EM1, a first electrode connected to a high-level voltage line EVDD, and a second electrode connected to a drain node DTD. The third switching transistor T3 can be turned on based on a first emission control signal applied through the first emission control line EM1 to transmit a high-level voltage applied through the high-level voltage line EVDD to a first electrode of the driving transistor DT. In this regard, the first emission control signal may be described with reference to the waveform illustrated in FIG. 8.

The fourth switching transistor T4 may have a gate electrode connected to a second emission control line EM2, a first electrode connected to a source node (DTS), and a second electrode connected to an anode of the light-emitting diode OLED. The fourth switching transistor T4 can be turned on based on a second emission control signal applied through the second emission control line EM2 to transmit a driving current generated from the driving transistor DT to the anode of the light-emitting diode OLED. In this regard, the second emission control signal may be described with reference to the waveform illustrated in FIG. 8.

Referring to FIG. 7, the sub-pixel SP according to the fourth embodiment may include a first switching transistor T1, a second switching transistor T2, a third switching transistor T3, a fourth switching transistor T4, a fifth switching transistor T5, a sixth switching transistor T6, a compensation transistor CT, a driving transistor DT, a capacitor CST, a first compensation capacitor CB, a second compensation capacitor CA, and a light-emitting diode OLED. Since the switching transistor T1, the compensation transistor CT, the driving transistor DT, the capacitor CST, the compensation capacitor CB, and the light-emitting diode OLED have been described above with reference to FIG. 4, detailed descriptions thereto will be omitted.

The second switching transistor T2, the third switching transistor T3, the fourth switching transistor T4, the fifth switching transistor T5, the sixth switching transistor T6, and the second compensation capacitor CA may be included in the pixel driving circuit PDC illustrated in FIG. 5. Since the second switching transistor T2, the third switching transistor T3, and the fourth switching transistor T4 have been described above with reference to the third embodiment, the fifth switching transistor T5, the sixth switching transistor T6, and the second compensation capacitor CA will be described as follows.

The fifth switching transistor T5 may have a gate electrode connected to a third scan line SCAN3, a first electrode connected to an initialization voltage line VAR, and a second electrode connected to an anode of the light-emitting diode OLED. The fifth switching transistor T5 can be turned on based on a third scan signal applied through the third scan line SCAN3 to transmit an initialization voltage applied through the initialization voltage line VAR to the anode of the light-emitting diode OLED. In this regard, the third scan signal and the initialization voltage may be described with reference to the waveform illustrated in FIG. 8.

The sixth switching transistor T6 may have a gate electrode connected to a fourth scan line SCAN4, a first electrode connected to a reference voltage line VREF, and a second electrode connected to a first electrode of the second compensation capacitor CA. The sixth switching transistor T6 can be turned on based on a fourth scan signal applied through the fourth scan line SCAN4 to transmit a reference voltage applied through the reference voltage line VREF to the first electrode of the second compensation capacitor CA. In this regard, the fourth scan signal and the reference voltage may be described with reference to the waveform illustrated in FIG. 8.

The second compensation capacitor CA may have a first electrode connected to the second electrode of the sixth switching transistor T6 and a second electrode connected to a source node DTS. The second compensation capacitor CA may enable the reference voltage applied through the sixth switching transistor T6 to be stably applied to or maintained at the source node DTS for a certain period of time. In this manner, when the second compensation capacitor CA is included in the subpixel SP, the compensation capacitor CB in the signal delay compensation circuit CC corresponds to a circuit added to prevent formation of a current path rather than to store a voltage, and thus may be implemented to have a capacitance smaller than the capacitance of the capacitor CST and the second compensation capacitor CA.

In the first to fourth embodiments, each of the transistors included in the subpixel SP has been exemplarily described and illustrated as an n-type transistors. However, the inventive concepts are not limited thereto, and at least one transistor may be a p-type transistor. More particular, the transistors included in the subpixel SP may be configured as n-type transistors, p-type transistors, or a mixture of n-type and p-type transistors in some embodiments.

Further, in the first to fourth embodiments, the first electrode of the compensation transistor CT is exemplarily illustrated as being connected to the high-level voltage line EVDD. However, the inventive concepts are not limited thereto, and the first electrode of the compensation transistor CT may be connected to a DC voltage line through which a voltage higher than the low-level voltage is applied. More particular, the compensation transistor CT may be connected to a separately provided DC voltage line in some embodiments.

The operations of the subpixels according to the first to third embodiments can be considered to be similar to the operation of the subpixel according to the fourth embodiment, and thus, the operation of the subpixel will be described below focusing on the fourth embodiment.

Figure 8:
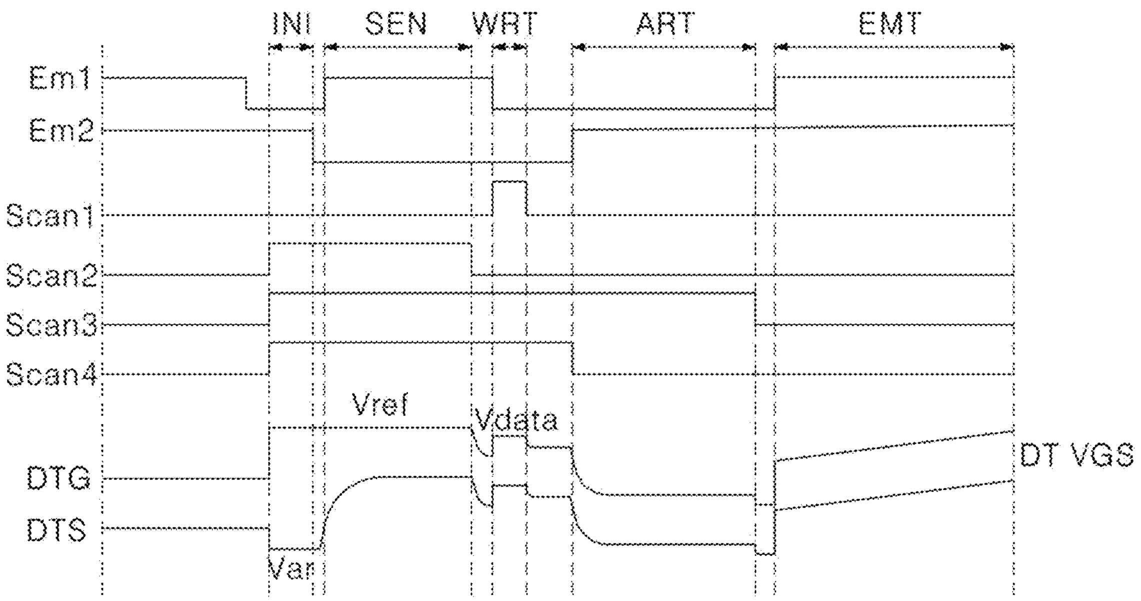
FIG. 8 is a waveform diagram showing driving waveforms of the subpixel according to the fourth embodiment shown in FIG. 7.

FIG. 8 is a waveform diagram showing driving waveforms of the subpixel according to the fourth embodiment shown in FIG. 7, and FIGS. 9, 10, 11, 12, and 13 are diagrams showing operating states of the subpixel according to the driving waveforms of FIG. 8.

As shown in FIG. 8 to FIG. 13, the sub-pixel SP according to the fourth embodiment may operate in the order of a first initialization phase INI, a threshold voltage sensing phase SEN, a data writing phase WRT, a second initialization phase ART, and an emission phase EMT, which will be sequentially described as follows.

Figure 9:
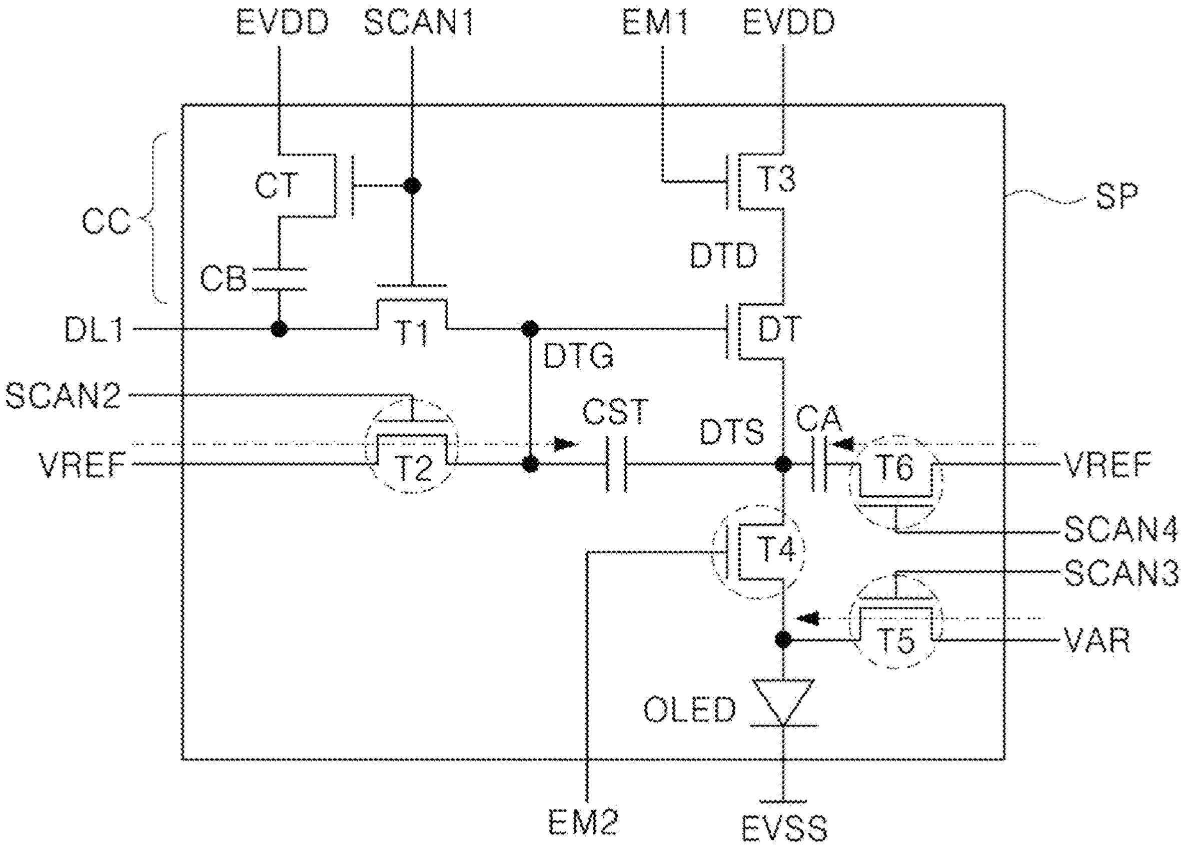
FIGS. 9, 10, 11, 12, and 13 are diagrams showing operating states of the subpixel according to the driving waveforms of FIG. 8.

As shown in FIG. 8 and FIG. 9, during the first initialization phase INI, the second switching transistor T2, the fourth switching transistor T4, the fifth switching transistor T5, and the sixth switching transistor T6 can be turned on. For example, a second emission control signal EM2 at a high voltage may be applied to the second emission control line EM2, a second scan signal Scan2 at a high voltage may be applied to the second scan line SCAN2, a third scan signal Scan3 at a high voltage may be applied to the third scan line SCAN3, and a fourth scan signal Scan4 at a high voltage may be applied to the fourth scan line SCAN4. Note that a low voltage signal is applied to the remaining line(s) that are not described.

During the first initialization phase INI, the second switching transistor T2, the fourth switching transistor T4, the fifth switching transistor T5, and the sixth switching transistor T6 may perform the following operations.

The second switching transistor T2 may transfer the reference voltage Vref applied through the reference voltage line VREF to the gate node DTG and the first electrode of the capacitor CST. The sixth switching transistor T6 may transfer the reference voltage Vref applied through the reference voltage line VREF to the first electrode of the second compensation capacitor CA. The fifth switching transistor T5 may transfer the initialization voltage Var applied through the initialization voltage line VAR to the anode of the light-emitting diode OLED. The fourth switching transistor T4 may transfer the initialization voltage Var applied through the fifth switching transistor T5 to the source node DTS.

Accordingly, the voltage of the gate node DTG of the driving transistor DT may be increased based on the reference voltage Vref, and the voltage of the source node DTS of the driving transistor DT may be decreased based on the initialization voltage Var.

Figure 10:
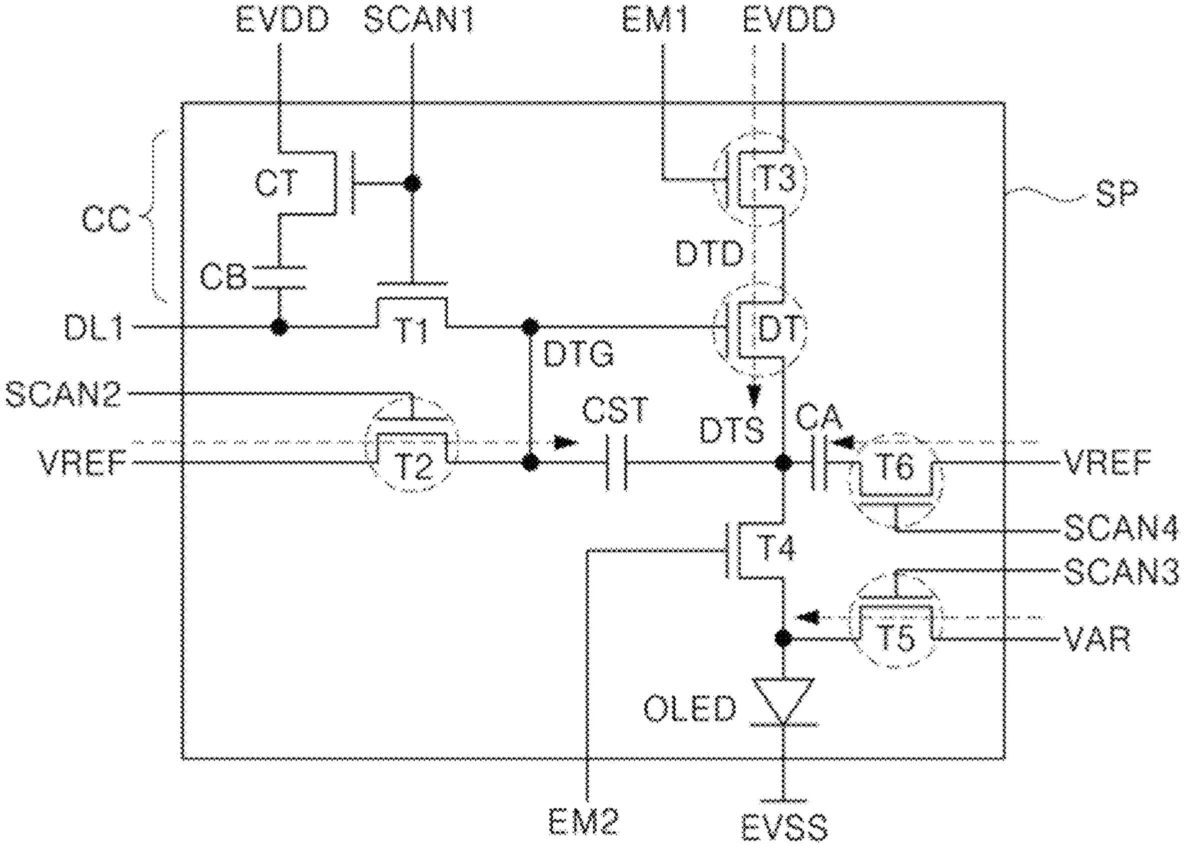

As illustrated in FIG. 8 and FIG. 10, the second switching transistor T2, the third switching transistor T3, the driving transistor DT, the fifth switching transistor T5, and the sixth switching transistor T6 can be turned on during the threshold voltage sensing phase SEN. For example, the first emission control signal Em1 at a high voltage may be applied to the first emission control line EM1, the second scan signal Scan2 at a high voltage may be applied to the second scan line SCAN2, the third scan signal Scan3 at a high voltage may be applied to the third scan line SCAN3, and the fourth scan signal Scan4 at a high voltage may be applied to the fourth scan line SCAN4. Note that a low voltage signal is applied to the remaining line(s) that are not described.

During the threshold voltage sensing phase SEN, the second switching transistor T2, the third switching transistor T3, the driving transistor DT, the fifth switching transistor T5, and the sixth switching transistor T6 may perform the following operations.

The second switching transistor T2 may transfer the reference voltage Vref applied through the reference voltage line VREF to the gate node DTG and the first electrode of the capacitor CST. The sixth switching transistor T6 may transfer the reference voltage Vref applied through the reference voltage line VREF to the first electrode of the second compensation capacitor CA. The fifth switching transistor T5 may transfer the initialization voltage Var applied through the initialization voltage line VAR to the anode of the light-emitting diode OLED. The third switching transistor T3 may transfer the high-level voltage applied through the high-level voltage line EVDD to the first electrode of the driving transistor DT.

Accordingly, the voltage of the gate node DTG of the driving transistor DT may be maintained at an increased level based on the reference voltage Vref, and the voltage of the source node DTS of the driving transistor DT may be increased based on the reference voltage Vref to allow sensing (sampling) of a voltage similar to the threshold voltage.

Figure 11:
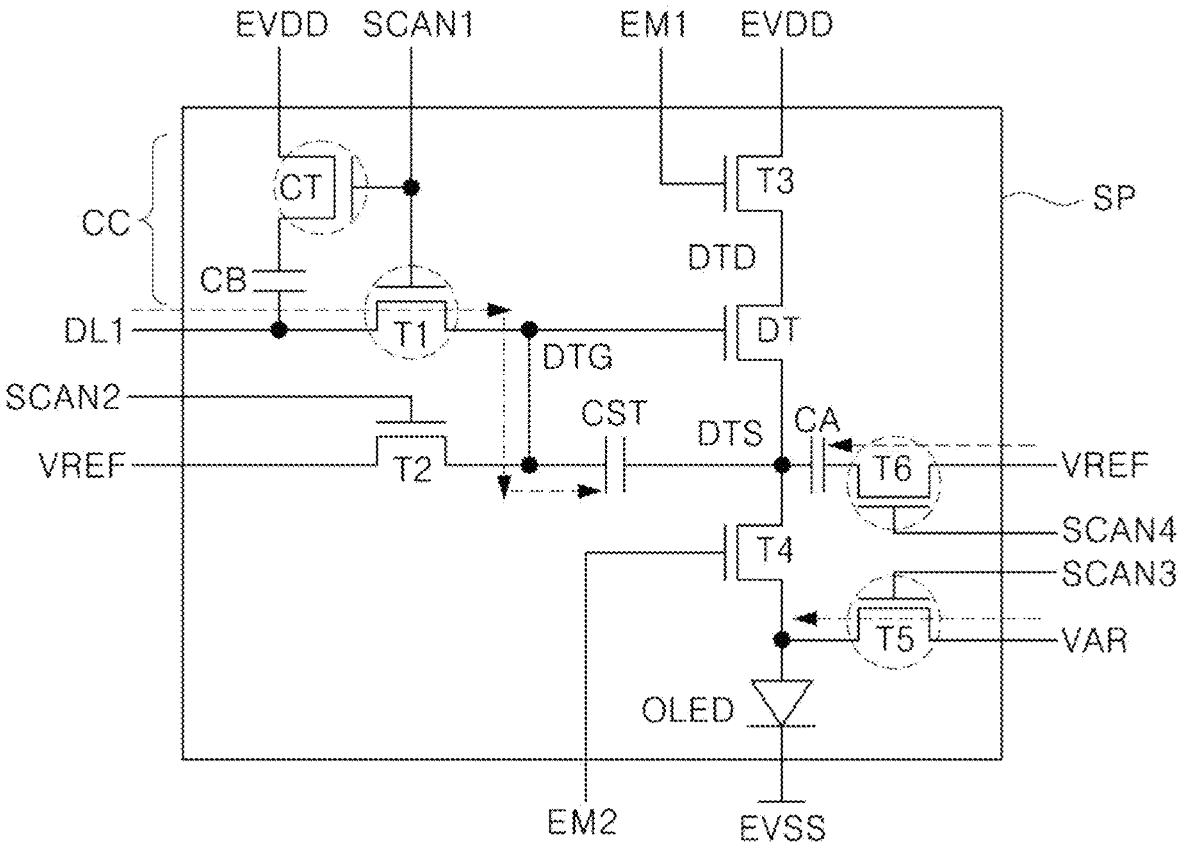

As illustrated in FIG. 8 and FIG. 11, the first switching transistor T1, the compensation transistor CT, the fifth switching transistor T5, and the sixth switching transistor T6 can be turned on during the data writing phase WRT. For example, the first scan signal Scan1 at a high voltage may be applied to the first scan line SCAN1, the third scan signal Scan3 at a high voltage may be applied to the third scan line SCAN3, and the fourth scan signal Scan4 at a high voltage may be applied to the fourth scan line SCAN4. Note that a low voltage signal is applied to the remaining line(s) that are not described.

During the data writing phase WRT, the first switching transistor T1, the compensation transistor CT, the fifth switching transistor T5, and the sixth switching transistor T6 may perform the following operations.

The first switching transistor T1 may transfer a data voltage Vdata applied through the first data line DL1 to the gate node DTG. The compensation transistor CT may transfer the high-level voltage applied through the high-level voltage line EVDD to the first electrode of the compensation capacitor CB. The sixth switching transistor T6 may transfer the reference voltage Vref applied through the reference voltage line VREF to the first electrode of the second compensation capacitor CA. The fifth switching transistor T5 may transfer the initialization voltage Var applied through the initialization voltage line VAR to the anode of the light-emitting diode OLED.

Accordingly, the data voltage Vdata can be applied to the first electrode of the capacitor CST, and the voltage of the gate node DTG and the source node DTS of the driving transistor DT may be increased based on the data voltage Vdata. More specifically, in an embodiment of the invention, during a data writing period, the compensation transistor CT may be turned on in synchronization with the first scan signal such that the EVDD voltage is applied to a first electrode of the compensation capacitor CB. By the coupling operation of the compensation capacitor CB, a voltage of the data line connected to a second electrode of the compensation capacitor CB may slightly increase, thereby changing a drain-source voltage Vds condition of the switching transistor T1. As a result, even when a low gray data voltage is applied, it is possible to suppress an excessive increase in the effective capacitance of the switching transistor T1 to reduce a delay of the scan signal, and while in a high gray state, the effective capacitance may be partially increased to alleviate the scan signal delay. Accordingly, a variation in scan signal transition time within the same row can be reduced, and horizontal crosstalk can be improved. For example, when a low-gray data voltage is applied through the data line, the coupling operation of the compensation capacitor CB causes the drain-source voltage of the switching transistor T1 to have a value greater than zero, and the switching transistor T1 thereby has the effective capacitance restrained from excessive increase. Further, when a high-gray data voltage is applied through the data line, the coupling operation of the compensation capacitor CB decreases a drain-source voltage of the switching transistor T1, and the switching transistor T1 thereby has the effective capacitance increased according to the decreased drain-source voltage.

Figure 12:
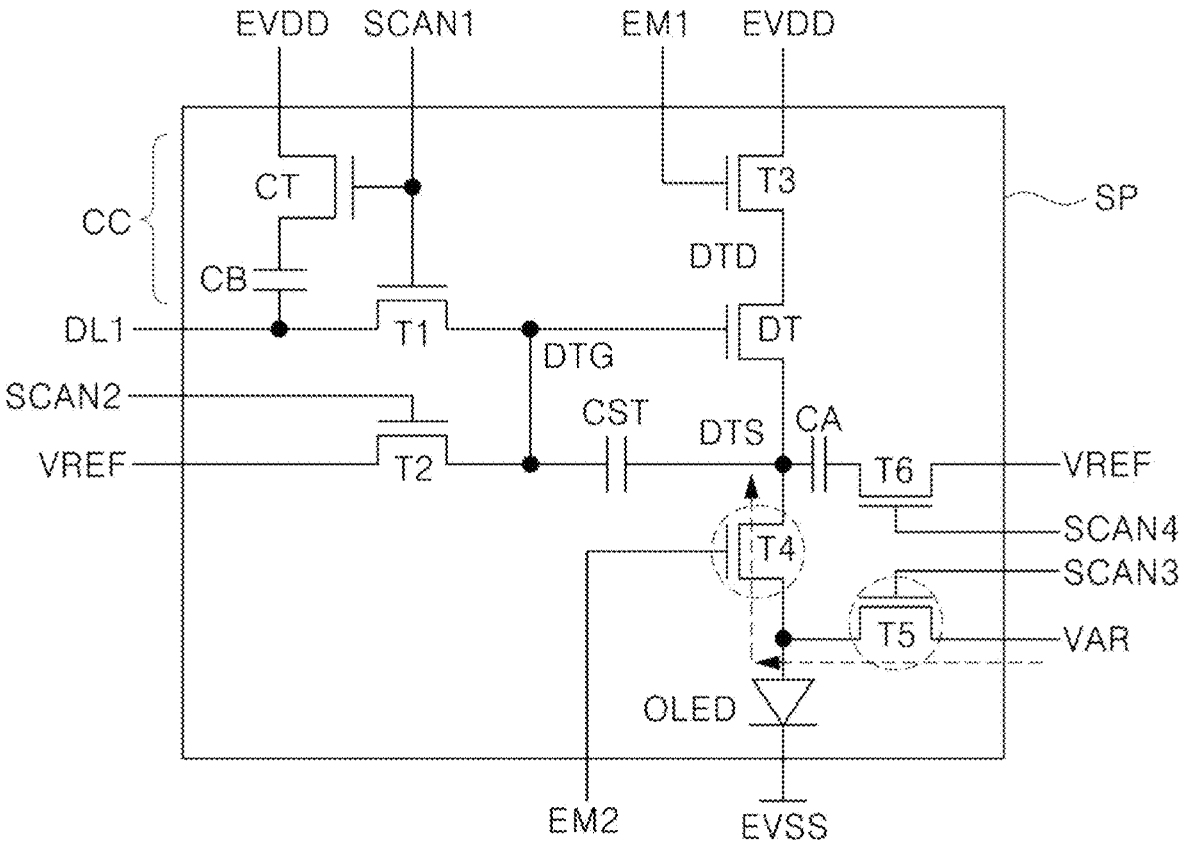

As shown in FIG. 8 and FIG. 12, during the second initialization phase ART, the fourth switching transistor T4 and the fifth switching transistor T5 can be turned on. For example, the second emission control signal Em2 at a high voltage may be applied to the second emission control line EM2, and the third scan signal Scan3 at a high voltage may be applied to the third scan line SCAN3. Note that a low voltage signal is applied to the remaining line(s) that are not described.

During the second initialization phase ART, the fourth switching transistor T4 and the fifth switching transistor T5 may perform the following operations.

The fifth switching transistor T5 may transfer the initialization voltage Var applied through the initialization voltage line VAR to the anode of the light-emitting diode OLED. The fourth switching transistor T4 may transfer the initialization voltage Var transmitted through the fifth switching transistor T5 to the source node DTS of the driving transistor DT.

Accordingly, the anode of the light-emitting diode OLED may be initialized based on the initialization voltage Var, and the voltage of the gate node DTG and the source node DTS of the driving transistor DT may be decreased based on the initialization voltage Var.

Figure 13:
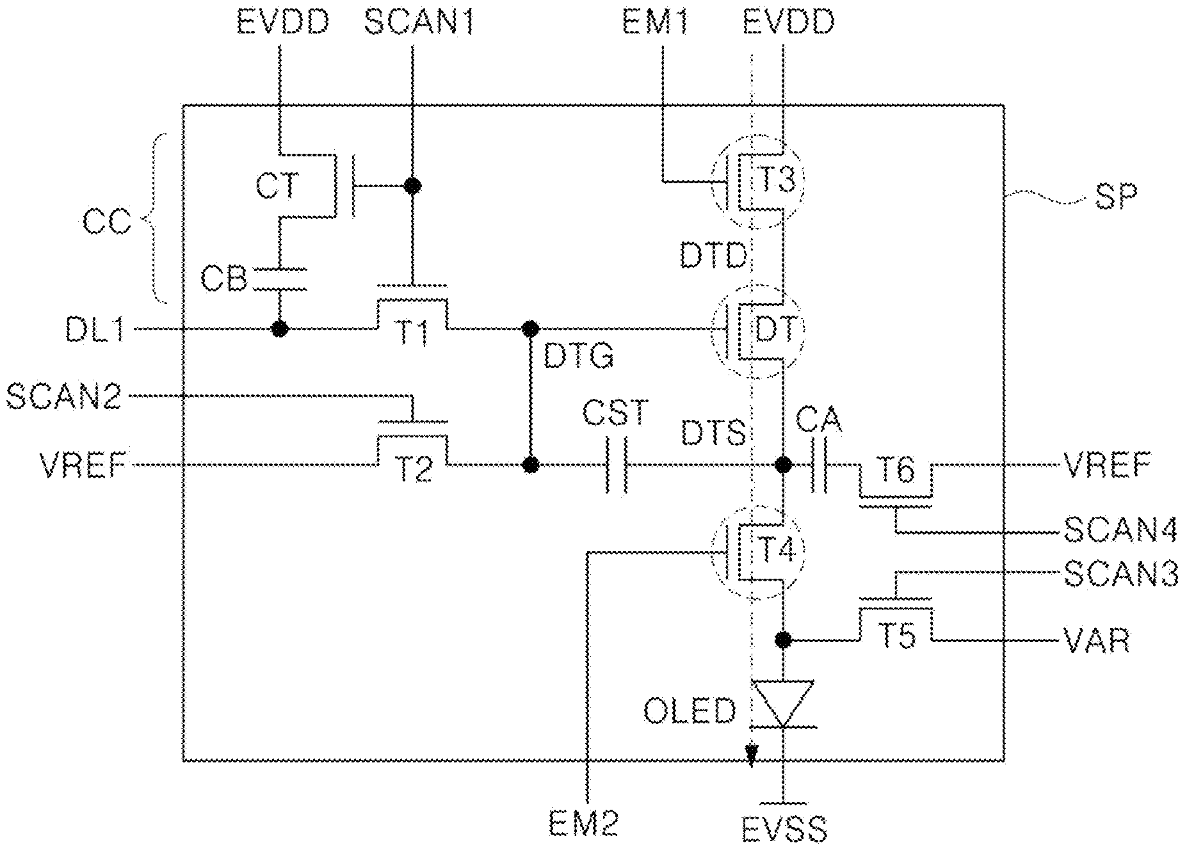

As shown in FIG. 8 and FIG. 13, the third switching transistor T3, the driving transistor DT, and the fourth switching transistor T4 can be turned on during the emission phase EMT. For example, the first emission control signal Em1 at a high voltage may be applied to the first emission control line EM1, and the second emission control signal Em2 at a high voltage may be applied to the second emission control line EM2. Note that the remaining line(s) not described are supplied with low voltage signals.

During the emission phase EMT, the third switching transistor T3, the driving transistor DT, and the fourth switching transistor T4 may perform the following operations.

The third switching transistor T3 may transfer the high-level voltage applied through the high-level voltage line EVDD to the first electrode of the driving transistor DT. The driving transistor DT can operate based on the data voltage stored in the capacitor CST to generate a driving current. The fourth switching transistor T4 may transfer the driving current generated from the driving transistor DT to the anode of the light-emitting diode OLED.

Accordingly, the voltage DT Vgs of the gate node DTG and the source node DTS of the driving transistor DT may be increased based on the operation due to generation of the driving current, and the light-emitting diode OLED may be operated based on the driving current generated from the driving transistor DT to emit light.

Meanwhile, as described with reference to FIGS. 8 and 11, the compensation transistor CT and compensation capacitor CB included in the subpixel SP can serve as a signal delay compensation circuit CC that compensates for signal delay (including signal delay variation) of the first scan signal, which will be described in detail below. Specifically, when the compensation transistor CT is turned on in synchronization with the first scan signal, the EVDD voltage may be applied to a first electrode of the compensation capacitor CB, and by the coupling operation of the compensation capacitor CB, a voltage of the data line connected to a second electrode thereof may slightly be increased. As a result, a drain-source voltage Vds condition of the switching transistor T1 is changed, and variations in the effective capacitance according to the data voltage level are reduced. Accordingly, variation in scan signal transition time within the same row can be decreased, and horizontal crosstalk can be improved. For example, when a low-gray data voltage is applied through the data line, the coupling operation of the compensation capacitor CB causes the drain-source voltage of the switching transistor T1 to have a value greater than zero, and the switching transistor T1 thereby has the effective capacitance restrained from excessive increase. Further, when a high-gray data voltage is applied through the data line, the coupling operation of the compensation capacitor CB decreases a drain-source voltage of the switching transistor T1, and the switching transistor T1 thereby has the effective capacitance increased according to the decreased drain-source voltage.

Figure 15:
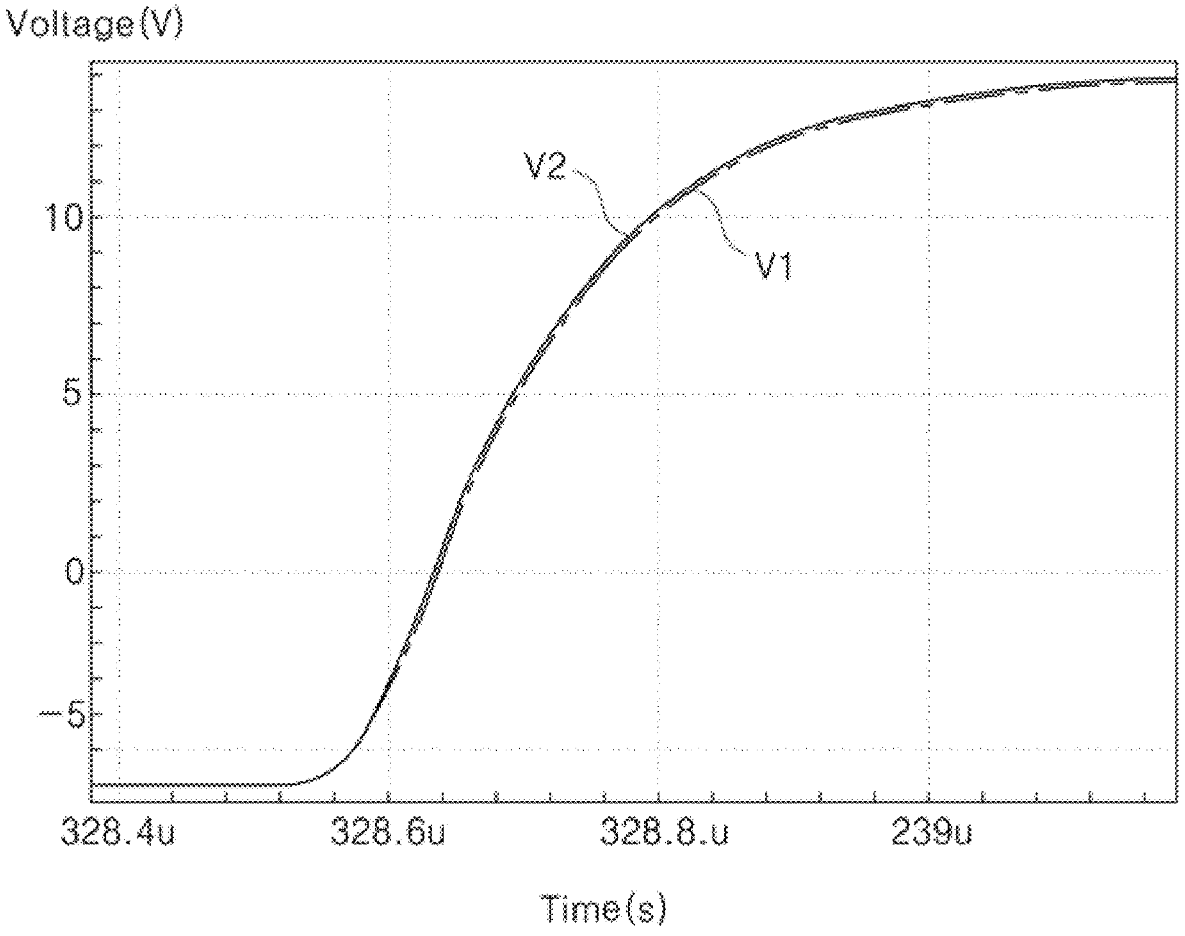
FIG. 15 is a graph of a simulation result showing a delay deviation of the first scan signal when the compensation transistor and the compensation capacitor are not included.
Figure 16:
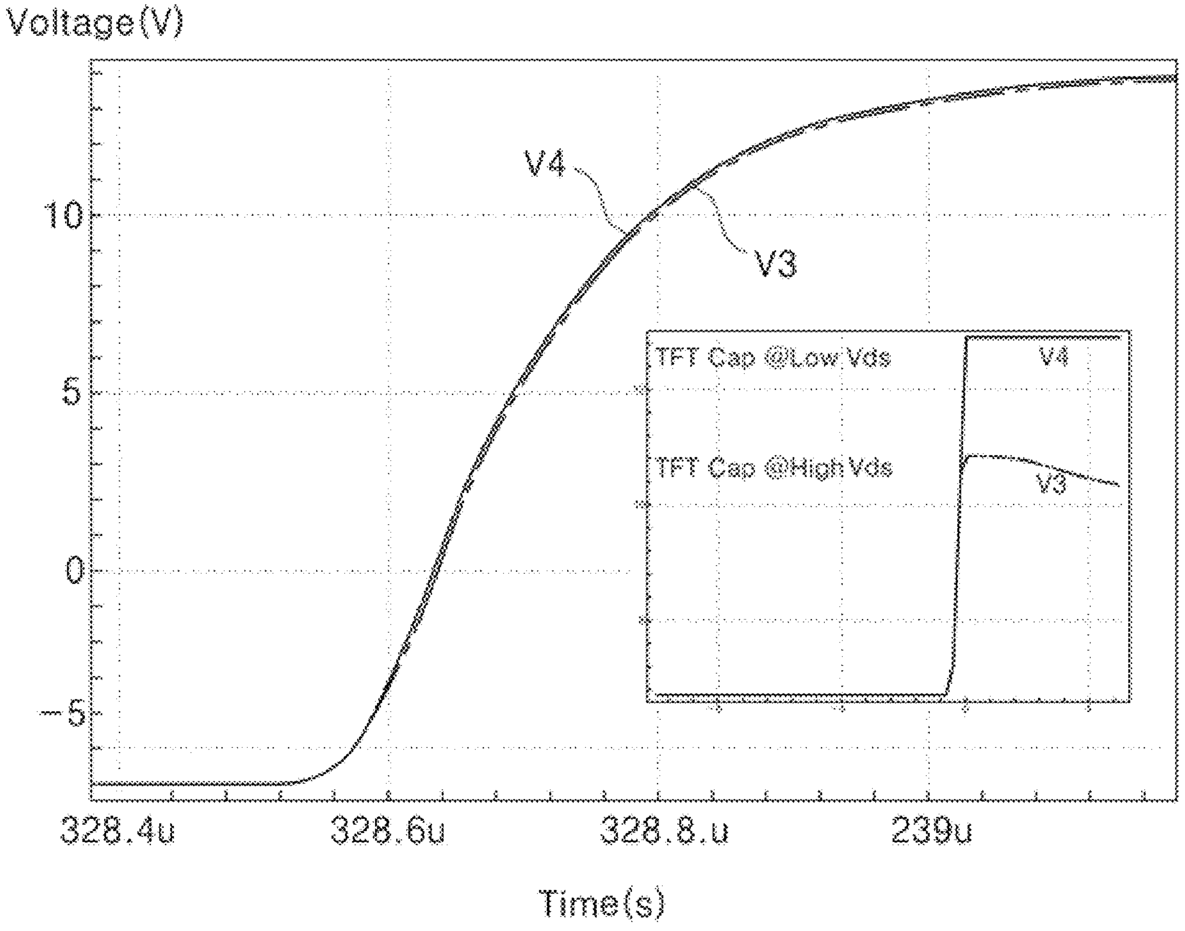
FIG. 16 is a graph of a simulation result showing a delay deviation of the first scan signal when the compensation transistor and the compensation capacitor are included.

FIG. 14 illustrates a first scan signal, a data voltage, and voltage values of a first switching transistor, which are provided to explain a principle of signal delay compensation when a compensation transistor CT and a compensation capacitor CB are included. FIG. 15 is a graph showing a simulation result for illustrating a delay deviation of the first scan signal that occurs in accordance with a change in the data voltage in a conventional circuit without the compensation transistor CT and the compensation capacitor CB, and FIG. 16 is a simulation result showing that the delay deviation of the first scan signal is compensated in a circuit according to an embodiment that includes the compensation transistor CT and the compensation capacitor CB.

FIG. 14 shows variations of a gate voltage G, a source voltage S, and a drain voltage D of the switching transistor T1, as well as changes of a gate-source voltage Vgs and a drain-source voltage Vds, when the first scan signal (Scan1) is applied as a high voltage (on voltage, e.g., 10V (on)) and a low voltage (off voltage, e.g., −10V (off)), and a high gray voltage W and a low gray voltage B are applied as examples of the data voltage (Vdata).

The result table of FIG. 14 illustratively shows voltage conditions of the switching transistor T1 including the compensation transistor CT and the compensation capacitor CB. In the conventional pixel circuit, when a low gray (black) data voltage is applied, the source voltage of the switching transistor T1 remains at 0V so that the drain-source voltage (Vds) is essentially 0, which causes the effective capacitance of the switching transistor T1 to increase excessively and leads to a large delay of the scan signal. In contrast, in the pixel circuit according to embodiments of the invention, as shown in FIG. 14, the coupling operation of the compensation transistor CT and the compensation capacitor CB slightly raises the data line voltage (i.e., the source voltage), so that the drain-source voltage Vds is secured to a certain level (e.g., about 6.5V), thereby suppressing the excessive increase of the effective capacitance and reducing the scan signal delay. Conversely, when a high gray (white) data voltage is applied, in the conventional circuit, the drain-source voltage Vds becomes relatively large, the effective capacitance decreases, and the delay is shortened, whereas in the embodiment, as shown in FIG. 14, the coupling effect reduces the drain-source voltage Vds, thereby increasing the effective capacitance of T1 and alleviating the scan signal delay.

Accordingly, the signal delay compensation circuit CC including the compensation transistor CT and the compensation capacitor CB according to an embodiment may actively vary the effective capacitance of the switching transistor T1 in response to changes in the data voltage. As a result, the delay is shortened in the low gray state and increased in the high gray state, thereby reducing transition time deviation within the same line. In this manner, the delay (including delay variation) of the first scan signal can be compensated without increasing the load of the gate node of the driving transistor, and horizontal crosstalk (HXT) induced by data patterns per horizontal line can be suppressed.

Meanwhile, the voltage values shown in the result table of FIG. 14 are merely example values for explaining signal delay compensation in the pixel circuit including the compensation transistor CT and the compensation capacitor CB.

FIG. 15 shows a simulation result of a conventional circuit without the compensation transistor CT and the compensation capacitor CB. As shown in FIG. 15, the effective capacitance of the switching transistor T1 varies depending on whether a low gray or high gray data voltage is applied, and accordingly, the transition speed of the first scan signal (Scan1) differs. As a result, a timing difference appears between the two waveforms (V1 and V2), which indicates that a delay deviation is induced depending on the data voltage pattern within the same row, leading to horizontal crosstalk (HXT).

FIG. 16 shows a simulation result of a pixel circuit according to an embodiment including the compensation transistor (CT) and the compensation capacitor (CB). As the operation of the CT and CB couples the data node voltage, in the low gray state, the drain-source voltage Vds of T1 increases compared with the conventional case, thereby suppressing the excessive increase of the effective capacitance and shortening the delay of Scan1. In contrast, in the high gray state, the effective capacitance increases compared with the conventional case, and the delay of Scan1 becomes somewhat longer. As a result, the transition time difference between the two conditions becomes smaller, significantly reducing the deviation within the same line. The waveforms in FIG. 16 illustrate this effect under the conditions of TFT Cap @ High Vds and TFT Cap @ Low Vds (or as the difference between a third voltage V3 and a fourth voltage V4), clearly showing how the pixel circuit according to an embodiment compensates for delay deviation.

As a result, according to embodiments of the invention, horizontal crosstalk (HXT) that may be induced per horizontal line (or per scan line) during data voltage writing can be alleviated by compensating for a delay (including signal delay variation) of a scan signal. In addition, a delay of the scan signal can be eliminated or at least substantially reduced without increasing the load of the gate node of the driving transistor by differentially compensating for the amount of capacitance change arising from a change in the data voltage (or grayscale variation in a pattern). Furthermore, display quality can be uniformly improved based on the reduction of horizontal crosstalk.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel circuit comprising:

a capacitor;

a switching transistor configured to be turned on in response to a scan signal applied through a scan line to transmit a data voltage applied through a data line to the capacitor;

a signal delay compensation circuit including a compensation transistor configured to be turned on in response to the scan signal and a compensation capacitor, the signal delay compensation circuit being configured to compensate for a signal delay of the scan signal in response to a change in the data voltage;

a driving transistor configured to generate a driving current based on the data voltage stored in the capacitor; and a light-emitting diode configured to operate based on the driving current to emit light.

2. The pixel circuit of claim 1, wherein the signal delay compensation circuit is configured to vary an effective capacitance of the switching transistor in response to a change in the data voltage.

3. The pixel circuit of claim 1, wherein the compensation transistor includes a gate electrode connected to the scan line and a first electrode connected to a DC voltage line.

4. The pixel circuit of claim 3, wherein the compensation transistor is configured to vary an effective capacitance of the switching transistor based on changes in a DC voltage applied through the DC voltage line and the data voltage.

5. The pixel circuit of claim 3, wherein:

the DC voltage line comprises a high-level voltage line; and the compensation capacitor comprises a first electrode connected to a second electrode of the compensation transistor and a second electrode connected to the data line.

6. The pixel circuit of claim 5, wherein a capacitance of the compensation capacitor is smaller than a capacitance of the capacitor.

7. A display device comprising:

a display panel including subpixels for displaying an image; and a driver configured to drive the display panel, wherein each of the subpixels includes a signal delay compensation circuit configured to be turned on according to a scan signal to compensate for a signal delay of the scan signal in response to a change in a data voltage.

8. The display device of claim 7, wherein a capacitance of the compensation capacitor is smaller than a capacitance of a capacitor storing the data voltage in each of the subpixels.

9. A method of driving a display device, comprising:

applying a scan signal to a scan line connected to a gate electrode of a switching transistor and storing a data voltage applied through a data line in a capacitor;

driving a signal delay compensation circuit based on the scan signal to compensate for a signal delay of the scan signal in response to a change in the data voltage; and driving a driving transistor to generate a driving current based on the data voltage and causing a light-emitting diode to emit light based on the driving current.

10. The method of claim 9, further comprising varying an effective capacitance of the switching transistor through operation of the signal delay compensation circuit in response to a change in the data voltage.

11. The method of claim 9, wherein the step of driving the signal delay compensation circuit further comprises:

turning on a compensation transistor included in the signal delay compensation circuit in synchronization with the scan signal to apply a high-level voltage to a first electrode of a compensation capacitor;

increasing a voltage of the data line by a coupling operation of the compensation capacitor included in the signal delay compensation circuit;

changing a drain-source voltage condition of the switching transistor; and varying an effective capacitance of the switching transistor in response to the changed drain-source voltage condition.

12. A pixel circuit comprising:

a switching transistor having a gate electrode connected to a scan line, a first electrode connected to a data line, and a second electrode connected to a first node;

a capacitor having a first electrode connected to the first node and a second electrode connected to a second node;

a driving transistor having a gate electrode connected to the first node, a first electrode connected to a first power supply line, and a second electrode connected to the second node;

a light-emitting diode having a first electrode connected to the second node and a second electrode connected to a second power supply line;

a compensation transistor having a gate electrode connected to the scan line and a first electrode connected to the first power supply line; and a compensation capacitor having a first electrode connected to a second electrode of the compensation transistor and a second electrode connected to the data line.

13. The pixel circuit of claim 12, wherein the first power supply line comprises a high-level voltage line and the second power supply line comprises a low-level voltage line.

14. The pixel circuit of claim 12, wherein the compensation capacitor is configured to perform a coupling operation to increase a voltage of the data line when the compensation transistor is turned on in synchronization with a scan signal applied to the scan line.

15. The pixel circuit of claim 14, wherein the coupling operation of the compensation capacitor changes a drain-source voltage condition of the switching transistor.

16. The pixel circuit of claim 15, wherein the switching transistor has an effective capacitance which varies according to the changed drain-source voltage condition.

17. The pixel circuit of claim 16, wherein, when a low-gray data voltage is applied through the data line, the coupling operation of the compensation capacitor causes the drain-source voltage of the switching transistor to have a value greater than zero, and the switching transistor thereby has the effective capacitance restrained from excessive increase.

18. The pixel circuit of claim 16, wherein, when a high-gray data voltage is applied through the data line, the coupling operation of the compensation capacitor decreases a drain-source voltage of the switching transistor, and the switching transistor thereby has the effective capacitance increased according to the decreased drain-source voltage.

19. The pixel circuit of claim 16, wherein the effective capacitance of the switching transistor comprises parasitic capacitances including a gate-to-source capacitance, a gate-to-drain capacitance, and a gate-to-bulk capacitance.

20. The pixel circuit of claim 19, wherein the compensation transistor and the compensation capacitor are configured to vary the effective capacitance of the switching transistor to compensate for transition delay of a scan signal applied to a scan line.

21. The pixel circuit of claim 12, wherein:

the capacitor is configured to store a data voltage supplied from the data line; and a capacitance of the compensation capacitor is smaller than a capacitance of the capacitor.

* * * * *